United States Patent [19]

Tsuchiya et al.

[11] Patent Number: 5,403,793
[45] Date of Patent: Apr. 4, 1995

[54] METHOD OF PRODUCING A CERAMIC SHAPE AND THAT CERAMIC SHAPE

[75] Inventors: Shinji Tsuchiya; Kimio Hirata, both of Kozaki; Shigeo Endo, Narita; Akira Itoh, Chiba; Yoshizo Orimo, Yokohama, all of Japan

[73] Assignee: Toshiba Monofrax Co., Ltd., Tokyo, Japan

[21] Appl. No.: 905,788

[22] Filed: Jun. 29, 1992

[30] Foreign Application Priority Data

Jul. 1, 1991 [JP] Japan ................... 3-185838

[51] Int. Cl.⁶ ........................... C04B 35/16
[52] U.S. Cl. ......................... 501/105; 501/128; 501/154
[58] Field of Search ............ 501/154, 105, 128; 423/335; 264/82

[56] References Cited

U.S. PATENT DOCUMENTS

| | | | |
|---|---|---|---|
| 3,791,835 | 1/1974 | Carini et al. | 106/68 |
| 4,221,596 | 9/1980 | Rice | 106/69 |
| 4,269,799 | 5/1981 | Rockwell | 264/85 |
| 4,390,501 | 6/1983 | Tanaami et al. | 422/143 |
| 4,460,524 | 7/1984 | Takahashi et al. | 264/26 |
| 4,943,398 | 7/1990 | Endo et al. | 264/82 |
| 5,127,463 | 7/1992 | Hirata et al. | 165/9.1 |

OTHER PUBLICATIONS

Kato et al., "Ceramic Core for Solidification—Controlled Castings" *Nonferrous Matacs & Alloys* vol.(62) #9 pp. 726–731 (Abstract) no date.

Derwent Abstract—Japanese Kokai No. 53-19238 Published (Laid Open) Jun. 20, 1978.

*Primary Examiner*—Mark L. Bell
*Assistant Examiner*—A. Wright
*Attorney, Agent, or Firm*—R. Lawrence Sahr

[57] ABSTRACT

A method of producing an electrocast brick or other ceramic shape, and the ceramic shape produced thereby, wherein the electrocast brick or other ceramic shape is cast in a mold which is formed, with a predetermined cavity shape and size, of quartz glass particles; the ceramic material of the ceramic shape may be $Al_2O_3$-$ZrO_2$-$SiO_2$ ceramic, $Al_2O_3$-$SiO_2$ ceramic or other heat meltable ceramic materials.

19 Claims, No Drawings

METHOD OF PRODUCING A CERAMIC SHAPE AND THAT CERAMIC SHAPE

FIELD OF THE INVENTION

The present invention relates generally to the production of bricks and other shapes of ceramic material and more specifically to a method of producing electrocast bricks (as well as other shapes).

BACKGROUND OF THE INVENTION

An electrocast shape, e.g., a brick is produced by application of the following basic steps:
 a) melting a raw material such as $Al_2O_3$-$ZrO_2$-$SiO_2$ ceramic or $Al_2O_3$-$SiO_2$ ceramic by an electric furnace or other means of melting the raw material;
 b) introducing, e.g., pouring, the molten ceramic material into a mold; and
 c) cooling the molten ceramic material into a solid shape.

Conventionally, silica sand is used as a mold material, preferably silica sand of a relatively high purity mixed with an organic binder, e.g., a phenol or furan resin. Useful natural silica sands are Vietnamese Cam Lam silica sand and Australian Fremantle silica sand, both of which are readily available at reasonable cost. Silica sands having grain sizes of 45 mesh (Tyler Mesh Screen Size) or greater in size are normally used. The mold material (the mixture of silica sand and organic binder) is formed into a predetermined shape so as to make a mold. A box shaped mold, for example, may be made by first forming plates of the mold material, curing the binder and then assembling the plates into a box with the interior of the box forming the mold cavity. The brick shape is then formed from this cavity. Alternatively, for example, the mold may be formed as a single piece with an integral hollow cavity, corresponding to the brick shape formed therein. Both of these methods are well known to those skilled in the art.

After the mold is fabricated and, preferably, the binder has cured (so as to maintain the structural integrity of the mold), molten ceramic material is poured into the mold, followed by the gradual cooling of that molten ceramic material to solidification. Solidification progresses from the outside exterior surfaces to the inside or center of the brick (or other shape) until all of the molten material is solidified, a phenomenon also well known to those skilled in the art.

To ensure slow cooling, a thermal insulation layer is arranged outside the mold to cover the mold and the solidifying shape within. The material used for the thermal insulation layer may be silica sand, the same material used to form the mold, or granular alumina particle material (bauxite) or diatomaceous earth may be used. The mold itself also acts as an insulator to enhance slow cooling due to the proximity of the mold cavity surfaces to the solidifying ceramic material within.

As the molten ceramic material is poured into the mold, the mold absorbs heat from that molten material, firstly from the molten material proximate to the mold cavity surfaces. Thus, the surfaces of the casting are cooled first and solidification progresses from the outside to the inside of the casting. Just after pouring, the surface temperature of the molten material starts to decrease, while the temperature, of the molten material relatively remote from the mold surfaces, is still greater. This causes the surface of the casting to tend to solidify and shrink first, before those center portions of the casting which are relatively remote from the mold cavity surfaces. On the other hand the mold is concurrently heated by the hot casting, and it expands. Thus, the casting tends to shrink as the mold tends to expand. The surfaces of the mold cavity, which are dimensionally greater than other cavity surfaces, correspondingly expand to a greater degree, thus the mold and its cavity tend to deform by elongation. This tends to cause the corresponding surfaces of the solidifying casting to, likewise, elongate. This phenomenon is also well known to those skilled in the art. Those discrete sections of the casting which have semi-solidified and/or solidified, as the mold and its cavity surfaces are elongating, tend to be pulled apart. The result is that edge cracks and/or corner cracks are occasionally formed on the surfaces of such castings.

Where the casting and corresponding mold are of relatively large scale, the casting corners or shape transition areas tend to cool first, even before the other surfaces of the casting. Thus, those casting corners or shape transition areas tend to solidify first. In such a situation, as the mold tends to elongate, it is somewhat inhibited by the solidifying casting corners and shape transition areas. Also, the larger the mold, the less uniform is the temperature throughout the mold, thus the less uniform is the elongation. The result of these two factors is that the more expansive surfaces of the mold cavity tend to deform by warpage, usually producing a convex surface which, in turn, produces a concave surface in the corresponding adjacent surfaces of the casting. Therefore, where larger scale castings are to be made, the inside surfaces of the mold cavities are curved or concaved to compensate so that they will tend to flatten during deformation by elongation.

Silica sand has a relatively high rate of thermal conductivity, i.e., silica sand is a relatively good conductor of heat. It follows that conventional molds formed from silica sand have relatively good capacity for cooling castings. In addition endothermic reactions associated with the crystalline transformation of the silica (quartz) from $\alpha$-phase to $\beta$-phase to amorphous (glass) phase, as described hereinafter, increase the cooling capacity. On the other hand, the silica sand particles, themselves, expand during such crystalline transformations. This also tends to produce edge cracks and concave surfaces in the castings. Concave surfaces can sometimes be repaired by expensive diamond grinding. Edge cracks cannot be repaired, and sometimes cause the castings to fracture. It goes without saying that neither concave surfaces nor edge cracks are desirable.

The crystalline phase transformation of quartz in silica sand is a curious phenomenon. Natural silica sand is composed almost entirely of the $\alpha$-phase quartz form of $SiO_2$. When heated up to 573° C., $\alpha$-phase quartz transforms into $\beta$-phase quartz (also known as cristobalite) with a transformation volume expansion of about 1.35%. At 1250° C., $\beta$-phase quartz transforms into quartz glass (also known as quartzite), the amorphous, non-crystalline, vitreous, fused form of quartz, with an ultimate transformation volume expansion of as much as 20% above about 1700° C.

As mentioned before the silica sand mold is rapidly (almost instantaneously in respect to the mold cavity surfaces) heated by the introduction of hot, molten ceramic material being poured into the mold. The silica sand transforms and expands according to the degree to which each discrete particle is heated by the introduction of the molten ceramic material. Some particles may develop surface cracks while others may develop internal, grain boundary or intra-granular cracks. These particle may break apart or shatter. During heating, stresses are developed within the particle and the quartzite particles and fusions are quite friable as a result of the phase transformation and volume changes.

A mold needs permeability, i.e., the ability to transmit gases therethrough. Fine powder or dust diminishes the permeability of a mold, as the fine powders and/or dust tend to reduce the volume of space between the particles of silica sand used to form the mold. Therefore, when a mold material is to be reused, the fine powder and dust must be substantially eliminated. This fine powder and dust, created by the breaking up and shattering of the quartz particles during heat-induced phase transformation, are disposed of as industrial waste. It is desirable for considerations of economics and cost reduction that mold material should be reused as much as possible. But each time the mold material is reused, there is less available, as some is reduced to fine powder and dust. Indeed, in the case of the production of electrocast brick, the natural silica sand mold material can only be used about twice, on average, before it is reduced in size to such a degree that the cost of separating the fines and dust from the remaining particle exceeds the cost of using virgin material. Further, the generation and processing of the fine powder and dust, including its separation from the reusable particles, creates a substantially more adverse work environment and, thus, diminished labor efficiency.

It has been discovered that when molten ceramic material is introduced by pouring into conventional silica sand molds, some of the silica sand particles are instantly broken and shattered due to thermal shock, even before any crystalline phase transformation commences. The thermal shock is a result of radiation heating of the mold cavity surface sand particles produced by the adjacent proximity of the extremely high temperature molten ceramic material. These fragments separate from the surface of the mold cavity and are entrained in the molten ceramic material, flowing with that molten material as it migrates throughout the mold cavity. The crystalline structure of the quartz of these fragmented particles of silica sand, as explained above, phase transform to cause expansion within the solidifying casting, resulting in internal stress build-up and cracking. Some of these fractured silica sand particles, the finest of them, gasify to create voids and blow holes in the casting as it solidifies. Both types of defects essentially render the castings useless, thus producing scrap.

Attempts have been made to use alumina materials for the mold materials. Particles of tabular alumina and fused alumina, both of which are substantially the stable α-phase of alumina, have been tried. Also, attempts have been made to use alumina mixed with entrapped air to produce such molds, a technique normally used to produce light-weight, alumina bubble refractories for insulation purposes. But castings produced using alumina mold material become fused to the mold materials, and seized within the mold, as the molten ceramic material tends to weld itself to the cavity surfaces of the alumina molds. These seized mold materials can only be removed with the expenditure of great labor, at a prohibitive cost.

An object of the present invention is to provide a method for producing quality electrocast bricks and other ceramic shapes free from concave surfaces, cracks and blow holes. A further object of the present invention is to reduce mold cost by use of a reusable mold material. These and other objects of the present invention will become apparent from a reading of the following Summary of the Invention, Detailed Description and Claims.

SUMMARY OF THE INVENTION

According to the present invention, an electrocast brick or other shape is produced by introducing molten ceramic material into a mold formed from particles of quartz glass, the mold having a predetermined cavity shape and size, and cooling the molten ceramic material to a solid to form a casting. The present invention includes both the method of production and the electrocast brick or other shape produced by the method. The electrocast brick or other shape may be made of $Al_2O_3$-$ZrO_2$-$SiO_2$ ceramic. The $Al_2O_3$-$ZrO_2$-$SiO_2$ ceramic may contain about 25 to 40% by weight of $ZrO_2$, preferably about 33%. Alternatively, the electrocast brick or other shape may be made of $Al_2O_3$-$SiO_2$ ceramic. The electrocast brick may be substantially a rectangular parallelpiped. The sizes of quartz glass particles used to produce the mold may be between 48 Tyler mesh and 8 Tyler mesh. The mold may also comprise organic binder by an amount of about 0.5 to 5 wt. %. The organic binder may be a furan resin or a phenol resin. In producing the casting, a slow cooling layer may be placed around the mold, and the slow cooling layer may be formed of quartz glass particles. Both the quartz glass particles of the mold and of the slow cooling layer may be substantially the same size range. About 95% or more of the used quartz glass particles may be reused to form new molds.

DETAILED DESCRIPTION

Quartz glass will not transform and has hardly any thermal expansion as it is the final phase transformation product of $SiO_2$. When quartz glass particles are heated by molten ceramic material, only a relatively very small number of them are broken or cracked to float into the melt. Therefore high quality electrocast bricks and other shapes can be produced using quartz glass molds.

The coefficient of thermal expansion of quartz glass is $5.5$–$5.8 \times 10^{-7} deg^{-1}$. The coefficient is so small that thermal expansion can be substantially neglected in molds formed from quartz glass particles. Therefore castings with high dimensional accuracy and reproducibility, and free from both concave surfaces and cracks, and free from blow holes, can be produced by using quartz glass molds. Further, the quartz glass mold material can be reused many times, thus reducing mold costs as well as the cost associated with the generation of large amounts of fine powder and dust.

The quartz glass particles used as mold material are preferably within a particle size range of about 48 mesh to 8 mesh (Tyler) for moderate permeability and strength of the mold. Organic binders such as furan resin and/or phenol resin are preferably added to the quartz glass particles for purposes of holding the particles together as a mold, i.e., for structural integrity. The amount of organic binder used is preferably 0.5–5% by weight of the quartz glass particle weight.

Additional quartz glass particles are preferably arranged outside the mold, to cover both the mold and the solidifying casting, as an annealing or slow cooling layer. The finer the quartz glass particles are, for the annealing or cooling layer, the better annealing effect that can be obtained, i.e., the finer the particles, the slower the cooling. But the same quartz glass particles as used for the mold are normally to be used, simply for the sake of convenience from the point of cost and economy in the manufacturing process.

Molds using quartz glass particles can also be formed by the well known vacuum suction method, but without the addition of an organic binder. Thus the use of an organic binder in some methods of forming molds is either not required or is optional.

Quartz glass particles are manufactured in various size ranges for use as filler material for the packaging of semiconductors. Therefore quartz glass particles are easily available but are somewhat more expensive than silica sand.

EXAMPLE OF THE PRESENT INVENTION

Quartz glass particles of +40 mesh −10 mesh (Tyler) were formed into a cubic mold having a cavity of 250×400×1500 mm, a furan resin being added as binder in an amount of 1.3 wt. % of the weight of quartz glass particles used. The mold was buried within a heat insulating (annealing) layer which was formed by quartz glass particles having similar size to those used for the mold. Only a feeding head (gate) was exposed above the mound of the quartz glass heat insulating layer. Then, molten $Al_2O_3$-$ZrO_2$-$SiO_2$ electrocast brick material including $ZrO_2$ at 33 wt. % was poured into the mold. After cooling, the casting was removed from the mold.

COMPARATIVE EXAMPLE

A mold and heat insulating layer were formed in a similar way to the Example of the Present Invention except that Fremantle silica sand of +40 mesh −10 mesh (Tyler) was used.

The electrocast brick of the Comparative Example had a concave gate surface by of about 7 mm in depth and several edge cracks at a corner between the bottom face (opposite the gate surface) and one side face. When the casting product of the Comparative Example was removed from the silica sand mold and heat insulating layer, a great amount of dust was generated. Thereafter silica sand used for the mold was gathered, washed with water and dried. The reusable particles equal to or larger than 40 mesh were separated and weighed by passing them through a 40 mesh (Tyler) screen. The reusable particles were only 48.5% by weight, with the balance falling through the screen.

On the other hand, with the Example of the Present Invention, a good quality, uniform casting was produced with neither concave surfaces nor edge cracks. To test the flatness of the casting surfaces, a standard diamond grinding apparatus was set to remove a maximum of 1 mm. of material. All points on the surfaces showed evidence of grinding, thus indicating that no part of the surfaces was concave by 1 mm or more. The quartz glass particles of the mold were gathered, washed with water and dried. The reusable particles equal to or larger than 40 mesh were separated and weighed. The reusable particles were 98% by weight.

According to the method of the present invention, a mold is formed of quartz glass particles. The quantity of quartz glass particles fractured or cracked when exposed to molten ceramic material and suddenly heated, is so small as to not be detectable by observation, thus relatively few particles come from the mold to be entrained into the molten ceramic material flow. The molten material level rises calmly in the mold, showing no evidence of turbulence and/or excessive gas bubbles as found when silica sand is used as a mold material. Thus a good quality casting with smooth, flat faces and free from cracks and blow holes can be produced.

The quartz glass particles can be used many times as mold material. In the Example of the Present Invention, the recovery percentage was, for example, 98 wt. %. It has been determined that 95 wt. % of the initial, virgin quartz glass particles can be used 20 times on average, while conventional silica sand particles can be used only twice on average. Because the quartz glass particles can be used so many times as a mold material, the cost of the molds is greatly reduced in comparison to the use of conventional silica sand, even though quartz glass particles cost about 8 times as much as silica sand. Further, the yield rate is substantially greater, with much less percentage of scrap castings. In addition there is much less of an amount of fine powder and dust generated according to the present invention. Therefore the installation and operating costs of dust collectors can be essentially eliminated, and the disposal cost of waste sand fine powder and dust can also be substantially reduced. Thus the overall cost can be further reduced.

The thermal conductivity rate of quartz glass is less than that of silica sand. It is, for example, 65% of the thermal conductivity rate of natural silica sand. This is partially explained by the fact that quartz glass has a density of 2.21 g/cm$^3$, which is less than the 2.65 g/cm$^3$ density of silica sand. Consequently, the quartz glass particle mold absorbs less quantity of heat (in calories) per unit of time than does an equivalent conventional silica sand mold. Thus, the quartz glass particle mold does not quickly absorb heat from the casting being formed. In addition, the coefficient of thermal expansion of quartz glass is $5.5$–$5.8 \times 10^{-7}$, being so small that thermal expansion of the mold can substantially be ignored. Thus, castings free from internal stresses, concave surfaces and cracks can be produced according to the present invention.

Because the thermal conductivity rate of quartz glass is less than that of conventional silica sand, quartz glass particles used as a protective slow cooling layer will tend to permit cool down of the casting and mold at a slower rate. Thus, quartz glass particles are a better material for use as a slow cooling (annealing) layer in comparison to conventional silica sand.

As mentioned before, according to the present invention, high quality electrocast bricks and other shapes, having smooth, flat surfaces without cracks or blow holes, can be consistently cast. In addition, the production costs can be reduced because quartz glass can be used many times and does not generate much in terms of waste fine powder and dust.

Although the foregoing describes the current preferred embodiment and best presently know mode of the present invention, there are many variations and alternatives for application of the present invention and its products. Thus it is to be understood that the scope of the present invention is restricted, constrained and limited only by the scope of the following claims.

What is claimed is:

1. A method of producing a ceramic electrocast brick, of essentially a composition selected from the group consisting of $Al_2O_3$-$ZrO_2$-$SiO_2$ and $Al_2O_3$-$SiO_2$, comprising introducing molten ceramic material into a mold formed from an organic binder and particles of quartz glass, said particles being between 48 Tyler mesh and 8 Tyler mesh in size, said mold having a cavity, and cooling said molten material into a solid to form a casting.

2. A method according to claim 1, wherein said Al$_2$O$_3$-ZrO$_2$-SiO$_2$ ceramic material contains 25 wt. % to 40 wt. % of ZrO$_2$.

3. A method according to claim 2, wherein said Al$_2$O$_3$-ZrO$_2$-SiO$_2$ ceramic material contains 33 wt. % of ZrO$_2$.

4. A method according to claim 1, wherein said electrocast brick is substantially a rectangular parallelpiped.

5. A method according to claim 1, wherein said organic binder is within a range of 0.5-5 wt. % of the weight of said mold.

6. A method according to claim 5, wherein said organic binder is a furan resin.

7. A method according to claim 5, wherein said organic binder is a phenol resin.

8. A method according to claim 1, wherein a slow cooling layer is placed around said mold.

9. A method according to claim 8, wherein said slow cooling layer is formed of quartz glass particles.

10. A method according to claim 8, wherein said quartz glass particles of said mold and said slow cooling layer are substantially the same sizes.

11. A method according to claim 1, wherein 95% or more of said quartz glass particles are reused when a new mold is formed.

12. A method of producing a ceramic electrocast brick, of essentially a composition selected from the group consisting of Al$_2$O$_3$-ZrO$_2$-SiO$_2$ and Al$_2$O$_3$-SiO$_2$, comprising the steps of:
 a.) shaping a mixture of organic binder and particles of quartz glass, said particles being between 48 Tyler mesh and 8 Tyler mesh in size, so as to form a mold having a cavity;
 b.) introducing molten ceramic material into said cavity of said mold;
 c.) solidifying said ceramic material;
 d.) removing said solidified ceramic material from said mold;
 e.) recovering at least 95 wt. % of said particles of quartz glass for reuse in a subsequent mold, said recovered particles being between 48 Tyler mesh and 8 Tyler mesh in size; and
 f.) shaping a mixture of binder and said recovered particles of quartz glass so as to form a subsequent mold having a cavity.

13. A method according to claim 12, wherein said Al$_2$O$_3$-ZrO$_2$-SiO$_2$ ceramic material contains 25 wt. % to 40 wt. % of ZrO$_2$.

14. A method according to claim 13, wherein said Al$_2$O$_3$-ZrO$_2$-SiO$_2$ ceramic material contains 33 wt. % of ZrO$_2$.

15. A method according to claim 12, wherein said molten ceramic material is produced by melting material from the group consisting of Al$_2$O$_3$-ZrO$_2$-SiO$_2$ material and Al$_2$O$_3$-SiO$_2$ material by an electric furnace.

16. A method according to claim 12, wherein said organic binder within a range of 0.5-5 wt. % of the weight of said mold.

17. A method according to claim 16, wherein said organic binder is a furan resin.

18. A method according to claim 16, wherein said organic binder is a phenol resin.

19. A method according to claim 12, wherein said mold is burried in a heat insulation layer formed of quartz glass particles.

* * * * *